United States Patent [19]

Bucher et al.

[11] 4,128,131

[45] Dec. 5, 1978

[54] MULTIPLE SECTION IMPLEMENT WITH BEAM RAISED AND LOWERED ON MAST THEREOF

[75] Inventors: David H. Bucher; Harry M. Meinert, both of Des Moines, Iowa

[73] Assignee: Deere & Company, Moline, Ill.

[21] Appl. No.: 822,684

[22] Filed: Aug. 8, 1977

[51] Int. Cl.² ............................................. A01B 73/00
[52] U.S. Cl. .................................. 172/311; 172/451; 172/456; 280/411 A
[58] Field of Search .................. 172/311, 456, 451; 280/411 R, 411 A, 411 B, 411 C, 412, 413, 639, 656; 56/228, 385

[56] References Cited

U.S. PATENT DOCUMENTS

| 3,028,920 | 4/1962 | Wersterfer | 172/451 X |
|---|---|---|---|
| 3,403,737 | 10/1968 | Byrd | 172/451 X |
| 3,606,848 | 9/1971 | Dobbs et al. | 172/456 X |
| 3,841,413 | 10/1974 | Applewhite | 172/311 |
| 3,935,696 | 2/1976 | Pavel | 56/385 |
| 3,941,194 | 3/1976 | Orthman | 172/311 |
| 4,042,044 | 8/1977 | Honnold | 280/411 A X |

FOREIGN PATENT DOCUMENTS 442761  5/1975  U.S.S.R. .................. 172/311

Primary Examiner—Richard T. Stouffer

[57] ABSTRACT

A farm implement having a main transverse central frame and outer frames that are connected to opposite ends of the main frame to swing between transversely extending positions and rearwardly extending positions with respect to the central frame. The central frame carries a vertical mast on which is mounted a horizontal tool-supporting beam structure. A powered device is provided between the beam structure and the main central frame to raise the beam structure on the mast to thereby elevate the tools carried by the beam structure to a height permitting the outer sections to swing rearwardly and inwardly beneath the tools on the beam structure.

8 Claims, 3 Drawing Figures

MULTIPLE SECTION IMPLEMENT WITH BEAM RAISED AND LOWERED ON MAST THEREOF

BACKGROUND OF THE INVENTION

It has heretofore been known to provide multiple section implements composed of a central section and outer sections that extend transversely outwardly from the central section and which may be swung rearwardly for purposes of narrowing the implement when it is desired to transport it along the highway or through fence gates. In order to prevent interference of the tools carried on the outer sections with those on the central section the tools have been mounted on the respective frames of the central and outer sections so that they will rock about a transverse horizontal axis and will move from a horizontal disposition to a vertical disposition. In this way, interference is prevented. Such a structure in shown in U.S. Pat. No. 2,995,385 which issued to William V. Lohrman and William E. Knapp on Aug. 8, 1961.

It has also been known to provide sectionalized farm implements that require a relatively narrow central frame that carries a pair of transversely spaced pivots on a rear outer portion of the frame and to mount tool-carrying implements on the vertical pivots so that they may swing inwardly and rearwardly for transport purposes and, of course, be moved to transversely aligned positions for working operations. Such an arrangement is shown in U.S. Pat. No. 3,736,988 which issued to J. I. Cantral and R. O. Taube on June 5, 1973. One of the purposes of the structure shown in this patent is to have the vertical pivots transversely offset from the fore-and-aft center line of the central frame so that the implements or tools will not contact one another when the tool-carrying frames are swung rearwardly or in the fore-and-aft disposition.

One of the more conventional means of carrying tools on a multiple sectioned implement is to provide three or more transversely aligned beams with a central main beam being connectable to a tractor. The outer beams are carried on their own transport wheels and the central beam may or may not have its own beam depending in the manner it is connected to the tractor. The beams are normally used to carry any of a multitude of tools. For example, simple cultivator tools may be carried on the beams. However, more sophisticated equipment such as planters using chemical applicators as well as seed hoppers may also be mounted on such beams. In the latter case, if a folding system is used as shown in the aforementioned U.S. Pat. No. 2,995,385 it is often difficult to retain the chemicals or seeds in their respective hoppers.

In the type of rear folding implement shown in U.S. Pat. No. 3,736,988 there is no central tool-carrying frame. Rather there are only outer frames that are connected or joined together substantially on the fore-and-aft center line of the tractor. The difficulty with such an arrangement is that often the location of the vertical pivots are such that they interfere with the tools on the tool-carrying frames and the usages thereof are also limited.

SUMMARY OF THE INVENTION

With the above in mind it is the primary object of the present invention to provide a series of transversely extending beam type frames in which there is a central main frame that is connectable to a tractor. The outer beam-type frames are connected to opposite ends of the central frame to swing about a vertical axes on opposite ends of the central beam. Tools are carried on the outer frames and extend in most instances considerably rearwardly of those frames. The central frame has a vertical mast rigidly mounted thereon. A subframe or beam is carried on the mast to move vertically thereon. A power source, such as an hydraulic cylinder, is used to raise and lower the subframe above the level of the tools on the outer frames. Tools are carried on the subframe and extend generally rearwardly therefrom. When it is desired to fold the implement so that the outer sections or frames are in a fore-and-aft disposition, the subframe and its respective tools, are bodily raised vertically to a level above the outer frames and the tools thereon. Thus, the tools on the outer frames may swing under the tools on the central frame and without causing interference.

DESCRIPTION OF THE PREFERRED EMBODIMENT

Figure 1:
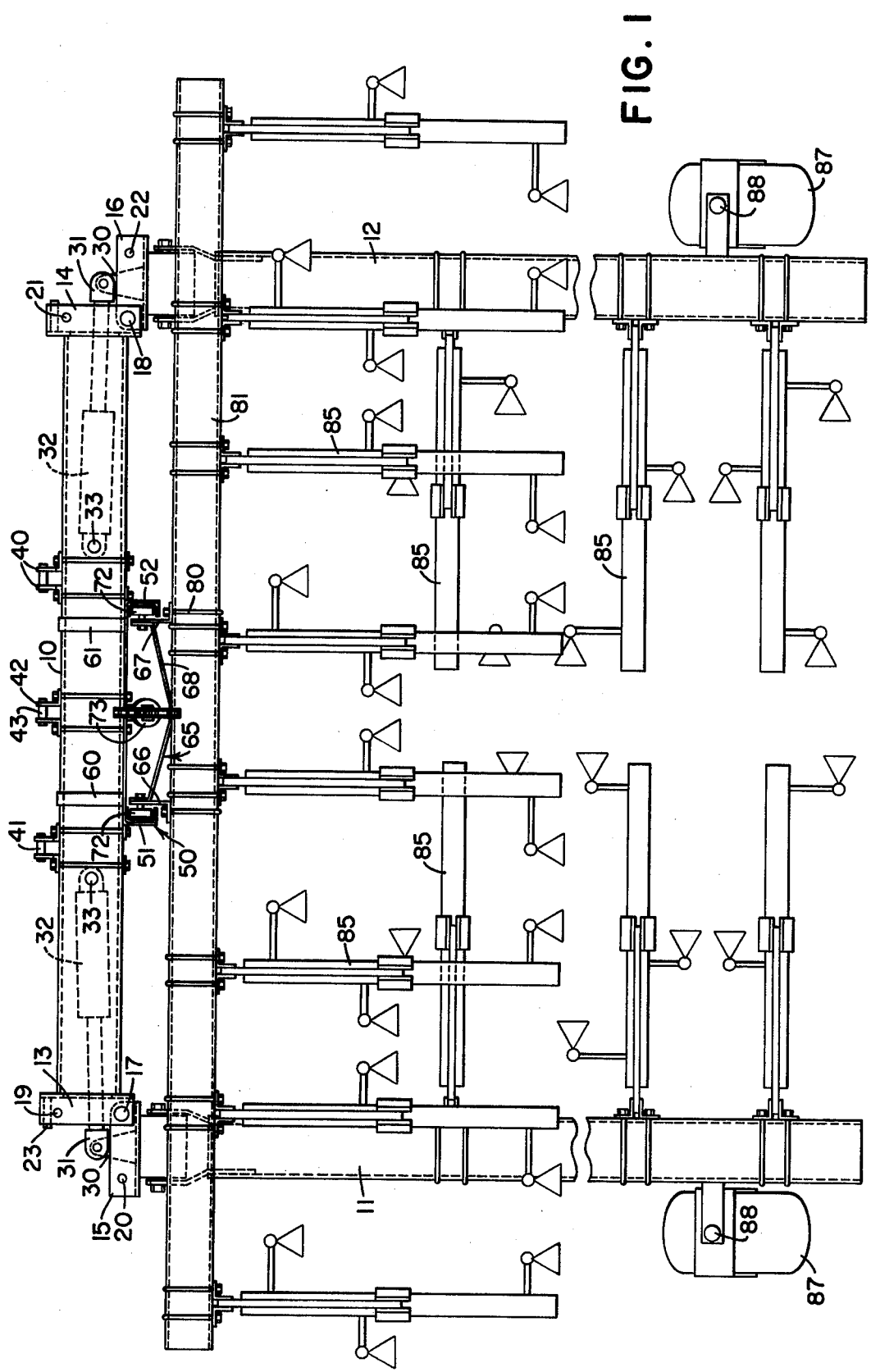
FIG. 1 is a plan view of a multiple sectioned farm implement showing the implement and its transport disposition.
Figure 2:
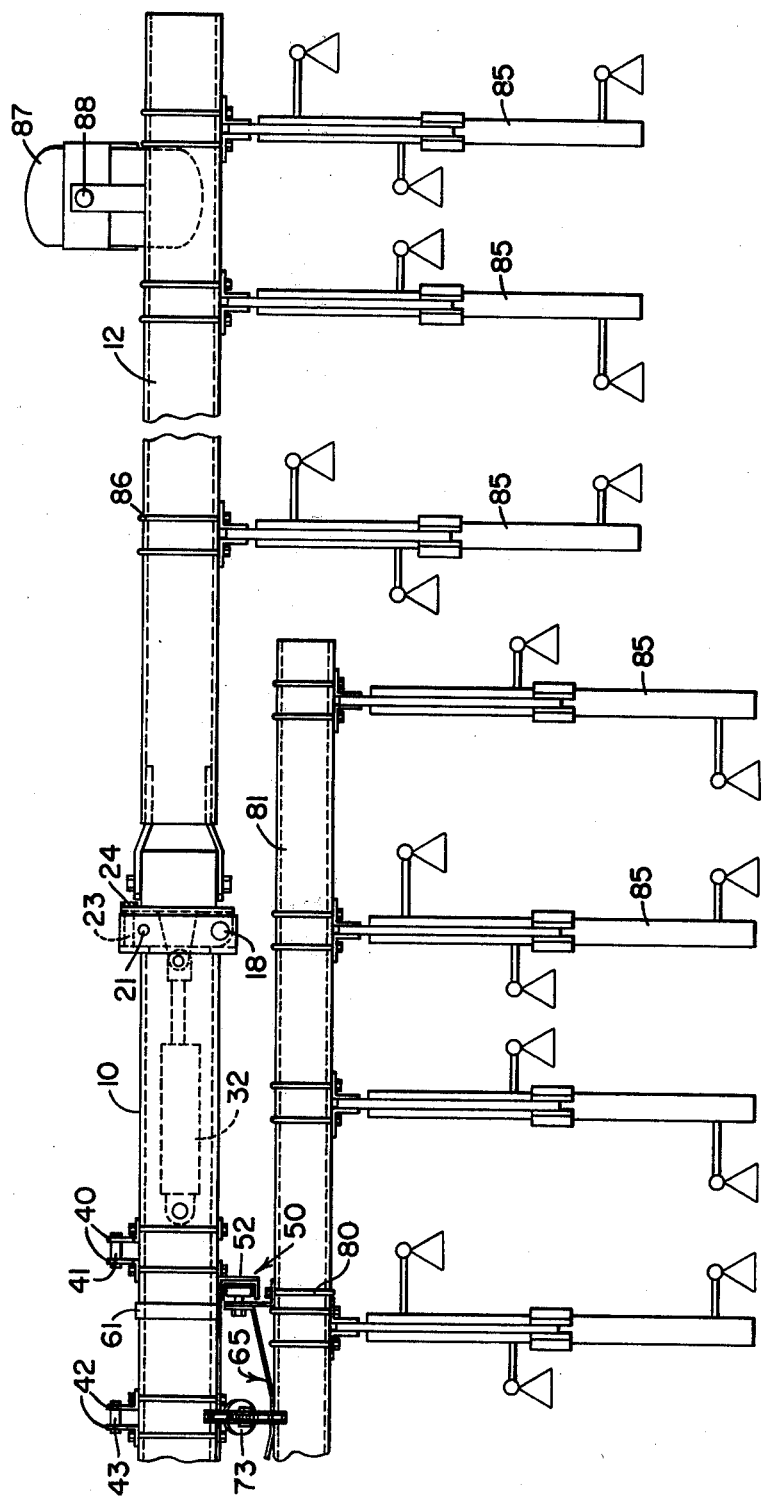
FIG. 2 is a plan view of the right half portion of the implement shown in FIG. 1 and showing the center and outer frame sections in a transversely aligned or working position.
Figure 3:
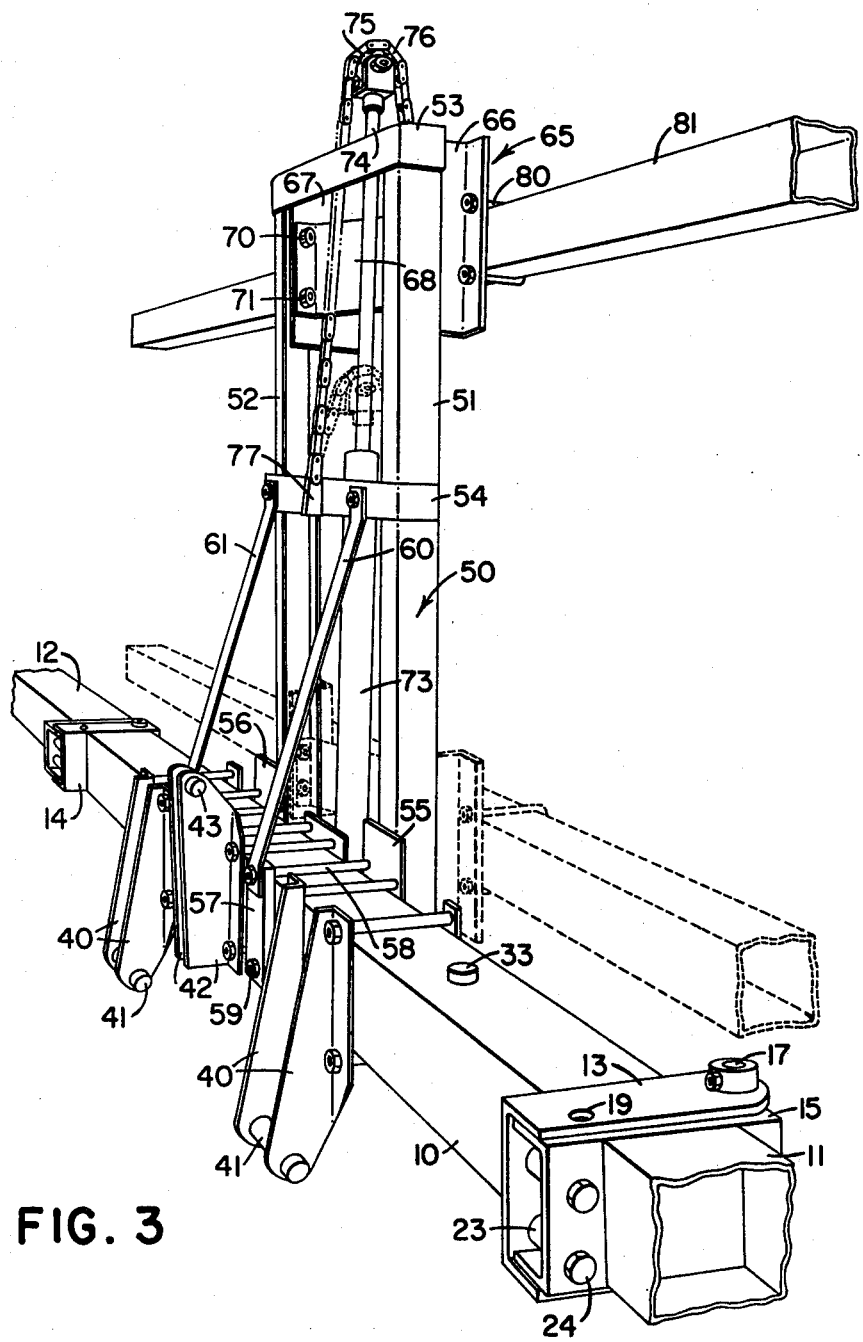
FIG. 3 is a prospective view taken from the front and lefthand end of the implement and showing generally the center section and innermost portions of the outer sections. The tool-carrying subframe carried on the center section is shown in full in its raised position and in dotted representation in its lowered or working position. For purposes of clarity the earthworking tools shown in FIGS. 1 and 2 are not shown in FIG. 3.

The farm implement shown in FIGS. 1, 2 and 3 is composed of a multiple number of frames including a central main frame 10 and outer frames 11 and 12. The frames 10–12 are rectangular in cross section and the central frame 10 has outwardly opening U-shaped channels 13, 14 at its outer ends. The outer frames 11, 12 have inwardly opening U-shaped channels 15, 16 fixed to their inner ends which fit internally of the corresponding channels 13, 14. The channels 13, 15 are pivotally joined by a vertical pivot pin 17 and the channels 13, 16 are pivotally connected together by a vertical pivot pin 18. The channel 13 is provided the opening 19 that is vertically registrable with an opening 20 in the channel 15. A pin may be dropped in the openings 19, 20 to hold the outer section 11 in transverse alignment with the center main frame section 10. For a similar purpose vertically registrable openings 21, 22 are provided in the channels 14, 16 respectively. Also fixed to the inner vertical face of the channels 13, 14 are vertically spaced internally threaded collars, such as at 23, that may receive bolts, such as at 24, for fixing the outer beams 11, 12 in their transversely aligned position with respect to the center main beam 10.

The channels 15, 16 have projecting gears 30 which carry vertical pivot pins that are connected to rod ends 31 of hydraulic cylinders 32. The cylinders 32 are disposed internally of the main beam 10. Vertical pivot pins 33 are provided for purposes of connecting the respective cylinder ends to the main beam. The cylinders 32 serve as power means for swinging the outer beams 11, 12 between their working position, as shown in FIG. 2, in which they are transversely aligned with the central section and their transport position, as shown in FIG. 1, in which they are extending rearwardly in trailing relation to the ends of the center section 10.

Supported on the center of the main beam 10 is structure connecting the beam 10 to a standard three point hitch of a tractor. The connecting structure is composed of transversely spaced pairs of upright brackets 40 that carry at their lower ends horizontal pins 41 each of which may be connected to the lower links of a standard three point hitch tractor connection. Centrally located between the brackets 40 is a third pair of vertical brackets 42 that are transversely spaced and carry at their upper ends a horizontal and transversely extending connecting pin 43 which may be connected to the upper link of a standard three point hitch connection on a tractor.

Fixed to the rear side of the main or central transverse beam 10 is a mast structure, indicated in its entirety by the reference numeral 50, and composed of a pair of opposed U-shaped channel members 51, 52 that are rigidly joined by horizontally extending brace structures 53, 54 at their upper ends and mid portions respectively. Fixed by welding to the front side of the channels 51, 52 are vertical plates 55, 56 respectively that bear against the rear face of the main beam 10. Complimentary to the respective plates 55, 56 are vertical plates, one of which is shown at 57, that bear against the front side of the beam 10. Upper bolts, 58 extend between the plates 55, 56 and 57 and across the upper side of the beam 10. Similar bolts 59 extend beneath the beam 10. Inclined braces 60, 61 extend from the upper ends of the plates 57 to the central brace 54 and serve to stabilize the mast structure 50. Upper and lower horizontal bolts that extend fore-and-aft above and below the beam 10 and connect various brackets 40, 42 to corresponding plates bearing against the side of the beam 10 are shown clearly in FIG. 3. However, it is believed detailed discipline of such is not necessary for a full understanding of the present invention. Mounted to move vertically on the mast 50 is a carriage, indicated in its entirety by the reference numeral 65, composed of a pair of upright transversely spaced L-shaped channels 66, 67 that are separated by a shallow V-shaped upright bracket plate 68 having fore-and-aft extending plate portions welded to the inner faces of the channels 66, 67. The plate portion and channels 66, 67 support vertically spaced roller pins as indicated at 70, 71 (FIG. 3) on which are carried rollers 72 received in the vertical recesses of the U-shaped channels 51, 52.

A vertical cylinder 73 is anchored at its lower end to the lower end of mast 50 and has a rod end 74 carrying a sprocket 75 over which is played a chain 76. One end of the chain 76 is anchored to a bracket 77 fixed to the middle brace 54. The other end of the chain is anchored to the carriage 65 generally at the midpoint thereof. Each L-shaped channel 66, 67 is provided with a U-bolt 80 that extends around a tool-carrying beam 81 that is horizontally disposed and extends transversely beyond the transverse expanse of the central main beam 10. It will be noted that outer end portions of beam 81 extend outwardly of the respective vertical pivot pins 17, 18. As may be clearly seen in FIG. 3 the carriage 65 and the subframe or toolbar 81 may be raised and lowered on the mast structure 50 by extending or retracting the hydraulic cylinder 73.

The outer frames or beams 11, 12 are provided with rearwardly extending tools indicated at 85. The tool structures may be mounted by U-shaped bolts 86 or other means that is conventional for mounting such tools. It should also be noted that while the present tools are representative of the cultivator-type tools, other types of tools such as planters, chisel plows, sprayers and others could be mounted on the respective beams. It should also be recognized that in many instances a unit carrier is used to carry any of a multitude of farm implement tools thereon. Therefore, the cultivator-type tool, such as shown at 85, is only for representative purposes and should be recognized as being representative of all kinds of farm implement tools and not just to the specific type shown. The beams 11, 12 are supported at their inner ends by the main beam 10 and at their outer ends by caster wheels 87 mounted on vertical pivots 88. It should be recognized that while the main central beam 10 is shown as being mounted integrally on a three point hitch, if the weight of the tools carried by the center beam is such that additional support is required, such may be had by adding additional wheels 87 on the main frame 10.

Referring now to FIGS. 1 and 2, it will be noted that similar tools 85 are carried in rearward extension from the subframe beam 81. It clearly becomes apparent that as the toolbar 81 is moved on the mast structure 50, the tools 85 carried on the frame 81 will also be moved.

In working operational position, the implement will be in a disposition as shown in FIG. 2 i.e., in which the outer beams 11, 12 are transversely aligned with the central or main beam 10. There is no interference between the tools 85 on the central and outer units at this point. However, when it is desired to narrow the implement for purposes of transport or for moving it through a fence opening, the beam 81 and the tools 85 carried thereon are raised to a level above the tools 85 carried on the outer units 11, 12. At this time, and assuming that the bolts 24 that releasably hold the outer frames 11, 12 in place are removed, the hydraulic cylinders 32 may be extended to shift the outer beams or frame units 11, 12 to a disposition shown in FIG. 1 in which they trail in a fore-and-aft disposition behind the central beam. Also, it will be noted the wheels 87 are then positioned behind the outer end portions of beam 81. Therefore, the transverse length of beam 81 determines the width of the implement when it is in its folded condition. The innermost tools 85 on the outer frames 11, 12 swing under the tools 85 on the frame unit 81. Thus, there will be no interference. When it is desired to again move the outer units 11, 12 in their transverse disposition, the reverse action by the cylinders 32 occurs and the beams are again locked in their proper working position.

We claim:

1. A multiple section implement comprising: a main central horizontal beam having opposite transversely spaced ends; a pair of transversely extending outer beams having inner ends pivotally mounted on the ends of said central beam to swing laterally on respective vertical pivots between fore-and-aft and transversely extending positions; means releasably holding the outer beams in their transversely extending positions; means on the main central beam for supporting the latter on a tractor; an upright mast fixed to the central beam; a transverse horizontal tool-supporting beam supported on the mast to travel up and down with respect to the mast; tool structures carried on and extending rearwardly from the outer beams and the tool-supporting beam in a predetermined attitude; and power means for raising and lowering the tool-supporting beam and its tool structures on the mast for said up and down travel while retaining the tool structures in substantially the same attitude to and from a level above the structures on the outer beams to thereby permit the outer beams to move to and from their fore-and-aft positions and for their structures to swing under the tool structures of the central mast.

2. The invention described in claim 1 in which the vertical pivots are on transverse opposite ends of the central beam, the tool-supporting beam has a transverse expanse greater than the spacing between the pivots so that the outer end portions of the tool-supporting beam are outside respectively the pivots, and at least part of the tools carried on the tool-supporting beam are carried on said outer end portions.

3. The invention described in claim 2 in which the outer beams are carried on wheels positioned forwardly of the respective outer beams when they are in their transversely extending positions and outboard of the beams when in their fore-and-aft positions and when in the latter positions are directly behind said outer end portions of said tool-supporting beam.

4. The invention described in claim 1 in which the central beam and outer beams are hollow tubular members that are transversely aligned when the outer beams are in transversely extending positions and further characterized by their being further connected to the central beam by fore-and-aft extending horizontal pivot means located outboard respectively of the respective vertical pivots that connect them to the central beam.

5. The invention described in claim 4 by hydraulic motors having a cylinder and ram ends at the adjoining ends of the central and outer beams with the cylinder of each being internal and connected to one of the beams and the ram end being connected to the other of the beams at the adjoining ends.

6. A multiple section implement comprising: a central horizontal tool-supporting beam having opposite transversely spaced ends; a vertical mast structure having transversely spaced opposite ends and supporting the central beam thereon for travel up and down with respect to the mast structure; a pair of transversely extending outer beams extending outwardly respectively of the opposite ends of the central beam and having inner ends pivotally mounted on the respective opposite ends of the mast structure so that the outer beams swing laterally between fore-and-aft and transversely extending positions; means for holding the outer beams in their transversely extending positions; rearwardly projecting tools disposed in predetermined attitudes and carried on the outer beams and the tool-supporting central beam; and means for raising the tool-supporting central beam and its tools on and with respect to the mast structure while retaining the tools in substantially the same attitude above the level of the tools on the outer frames to thereby permit the outer beams to move to and from their fore-and-aft extending positions and to move their tools under the tools of the central beam.

7. A multiple section implement comprising: a central horizontal tool-supporting frame having opposite transversely spaced ends; a pair of transversely extending outer frames extending outwardly respectively of the opposite ends of the central frame and having inner ends pivotally mounted so that the outer frames swing laterally between fore-and-aft and transversely extending positions; means for holding the outer frames in their transversely extending positions; a vertical mast structure supporting the central frame thereon for travel up and down with respect to the mast structure; tools carried on the outer frames and the tool-supporting central frame in general predetermined attitudes; and means for raising the tool-supporting frame and its tools on and with respect to the vertical mast structure and above the level of the tools on the outer frames while maintaining the tools on the central frame substantially in the same attitude to thereby permit the outer frames to move to and from their fore-and-aft positions and the tools carried thereon to move under the tools of the central frame.

8. A multiple section implement comprising: a main central horizontal beam having opposite transversely spaced ends; a pair of transversely extending outer beams having inner ends pivotally mounted on the ends of said central beam to swing laterally on respective vertical pivots between fore-and-aft and transversely extending positions; means releasably holding the outer beams in their transversely extending positions; means on the main central beam for supporting the latter on a tractor; a vertical mast fixed to the central beam composed of a pair of vertical U-shaped channels facing one another; a horizontal carrier having guide means at opposite end portions thereof riding in the vertical channels; a transverse horizontal tool-supporting beam; means connecting the carrier to the tool-supporting beam for vertical travel on the mast; tools carried on the outer beams and the tool-supporting beam; and a vertical cylinder having one end rigid with the central beam and the other end connected to the carrier for raising and lowering the tool-supporting beam and its tools on the mast to and from a level above the tools on the outer beams to thereby permit the outer beams to move to and from their fore-and-aft positions.

* * * * *